United States Patent
Campbell et al.

(10) Patent No.: US 10,190,652 B2
(45) Date of Patent: Jan. 29, 2019

(54) DAMPED AUTOMOTIVE DRIVELINE COMPONENT

(71) Applicant: GKN Driveline North America, Inc., Auburn Hills, MI (US)

(72) Inventors: Craig A. Campbell, West Bloomfield, MI (US); Arthur J. Ball, Oxford, MI (US); Michael J. Miller, White Lake, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 111 days.

(21) Appl. No.: 15/300,846

(22) PCT Filed: Apr. 23, 2015

(86) PCT No.: PCT/US2015/027324
§ 371 (c)(1),
(2) Date: Sep. 30, 2016

(87) PCT Pub. No.: WO2015/164621
PCT Pub. Date: Oct. 29, 2015

(65) Prior Publication Data
US 2017/0016511 A1    Jan. 19, 2017

Related U.S. Application Data

(60) Provisional application No. 61/982,918, filed on Apr. 23, 2014.

(51) Int. Cl.
*F16C 3/02* (2006.01)
*F16F 15/129* (2006.01)
(Continued)

(52) U.S. Cl.
CPC .............. *F16F 15/129* (2013.01); *F16C 3/02* (2013.01); *F16F 15/1207* (2013.01);
(Continued)

(58) Field of Classification Search
CPC .... F16F 15/129; F16F 15/1207; F16F 15/322; F16C 3/02; F16C 2326/06; Y10T 464/50
(Continued)

(56) References Cited

U.S. PATENT DOCUMENTS 1,740,362 A    12/1929  Mader
2,001,166 A *  5/1935  Swennes ................. F16F 15/10
                                                           464/180
(Continued)

FOREIGN PATENT DOCUMENTS

CN    1590802 A    3/2005
CN    1653278 A    8/2005
(Continued)

OTHER PUBLICATIONS

EP Extended Search Report for EP Application No. 15783261.9 dated Sep. 28, 2017 (7 pages).
(Continued)

*Primary Examiner* — Greg Binda
(74) *Attorney, Agent, or Firm* — Jennifer M. Brumbaugh; Reising Ethington P.C.

(57) ABSTRACT

A damped automotive driveline component can be propshaft, a bar shaft, a torque tube housing, a power transfer unit (PTU) housing, or a final drive unit (FDU) housing, among other possibilities. The component is equipped with a dampener in order to dissipate vibration experienced during use of the component. The damper includes metal wire strands. Relative movement among the metal wire strand is believed to damp the vibrations.

12 Claims, 14 Drawing Sheets

(51) Int. Cl.
*F16F 15/32* (2006.01)
*F16F 15/12* (2006.01)

(52) U.S. Cl.
CPC ........ *F16F 15/322* (2013.01); *F16C 2233/00* (2013.01); *F16C 2326/06* (2013.01); *Y10T 464/50* (2015.01)

(58) Field of Classification Search
USPC .......... 464/180, 183; 138/33, 174; 180/380, 180/381
See application file for complete search history.

(56) References Cited

U.S. PATENT DOCUMENTS

| | | | |
|---|---|---|---|
| 2,142,497 A * | 1/1939 | Clendenin | F16C 1/02 464/183 |
| 2,707,032 A | 4/1955 | Burton | |
| 4,747,799 A | 5/1988 | Kato | |
| 6,292,967 B1 * | 9/2001 | Tabatabai | E01D 19/16 |
| 7,204,762 B2 * | 4/2007 | Campbell | F16F 15/10 464/180 |
| 7,214,135 B2 | 5/2007 | Laskey et al. | |
| 7,281,547 B2 * | 10/2007 | Cleveland | B32B 1/08 138/174 |
| 8,454,449 B2 | 6/2013 | Ball et al. | |
| 8,474,802 B2 * | 7/2013 | Nicq | F16F 1/445 |
| 8,807,304 B2 | 8/2014 | Amano et al. | |
| 2005/0255927 A1 | 11/2005 | Michioka et al. | |
| 2007/0062664 A1 | 3/2007 | Schroth et al. | |
| 2009/0107787 A1 | 4/2009 | Walker et al. | |
| 2009/0197690 A1 | 8/2009 | Lyscio | |
| 2010/0314210 A1 | 12/2010 | Amano et al. | |
| 2011/0070957 A1 | 3/2011 | Ball et al. | |
| 2013/0256143 A1 | 10/2013 | Schroth et al. | |
| 2017/0012570 A1 | 1/2017 | Bauer | |

FOREIGN PATENT DOCUMENTS

| | | |
|---|---|---|
| CN | 101573545 A | 11/2009 |
| CN | 101855470 A | 10/2010 |
| DE | 4010901 A1 | 10/1991 |
| DE | 102011053896 A1 | 3/2013 |
| DE | 102011085045 A1 | 4/2013 |
| EP | 2899414 A1 | 7/2015 |
| GB | 2438633 A | 12/2007 |
| JP | 2004195893 A | 7/2004 |
| JP | 2013228094 A | 11/2013 |
| WO | WO2011056166 A1 | 5/2011 |

OTHER PUBLICATIONS

Written Opinion & International Search Report for PCT/US2015/027324 dated Jul. 16, 2015, 8 pages.
CN Office Action for CN Application No. 201580021169.8 dated Jul. 18, 2018 (10 pages).

* cited by examiner

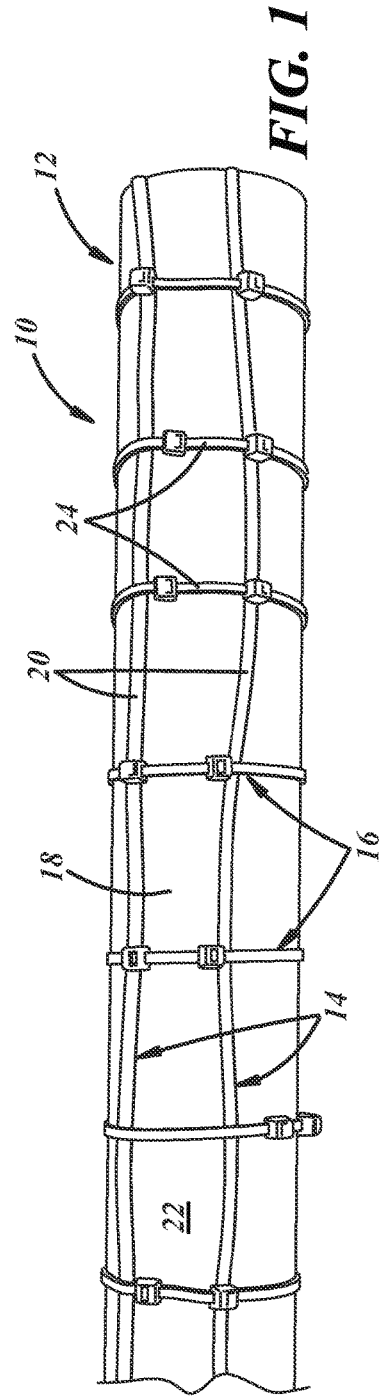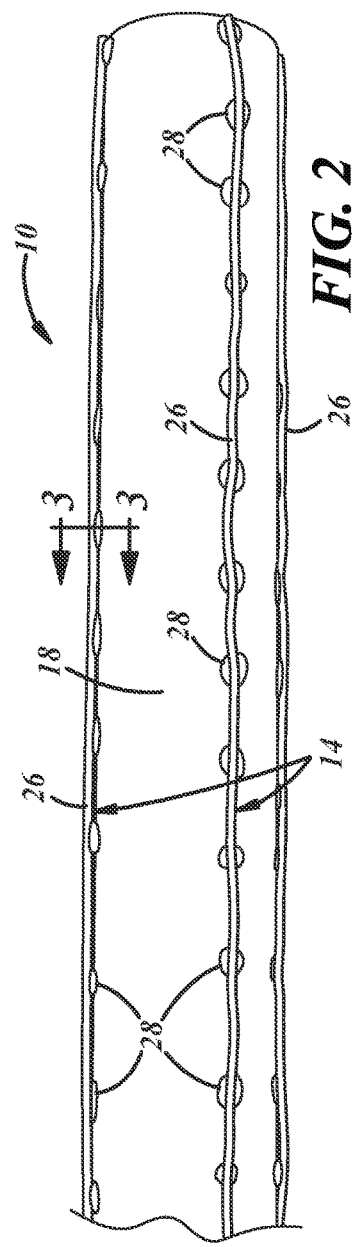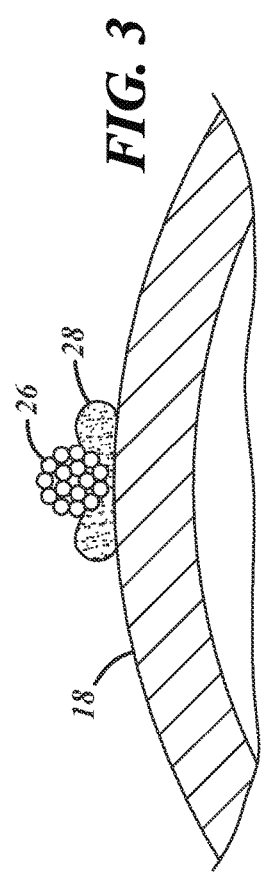

DAMPED AUTOMOTIVE DRIVELINE COMPONENT

REFERENCE TO COPENDING APPLICATIONS

This application claims the benefit of U.S. Provisional Patent Application Ser. No. 61/982,918 filed Apr. 23, 2014, which is incorporated herein by reference in its entirety.

TECHNICAL FIELD

The present disclosure relates generally to automotive driveline components, and more particularly to damping vibrations and other oscillations in automotive driveline components.

BACKGROUND

Automotive driveline components often experience vibrations and other oscillations during their operation in an automobile. The vibrations and oscillations can cause noise and other conditions that are mostly unwanted in the larger driveline assembly. Manufacturers have frequently sought to dissipate, and in some cases eliminate, the vibrations and oscillations with varying degrees of success.

SUMMARY

In one implementation, a damped automotive driveline housing may include a wall, a casing, and multiple metal wire strands. The casing is carried by the wall. The metal wire strands are held within the casing. When the wall experiences vibrations amid use of the automotive driveline housing, relative movement among the metal wire strands serves to damp the vibrations experienced by the wall.

In another implementation, a damped automotive driveline housing may include a tube, a vibration-transmitting attachment, and multiple metal wire strands. The vibration-transmitting attachment is located at an interior of the tube, and includes a carrier. The metal wire strands are located at the tube's interior and are held by the carrier of the vibration-transmitting attachment. When the tube experiences vibrations amid use of the automotive driveline housing, relative movement among the metal wire strands serves to damp the vibrations experienced by the tube.

In yet another implementation, a damped automotive driveline component may include a housing, a dampener, and a vibration-transmitting attachment. The dampener is carried by the housing, and includes multiple metal wire strands. The vibration-transmitting attachment holds the dampener to the housing. When the housing experiences vibrations during use of the automotive driveline component, the vibrations are transmitted to the metal wire strands by way of the vibration-transmitting attachment and relative movement among the metal wire strands serves to damp the vibrations experienced by the housing.

BRIEF DESCRIPTION OF THE DRAWINGS

The following detailed description of preferred embodiments and best mode will be set forth with reference to the accompanying drawings, in which:

FIG. 1 depicts an automotive driveline component, specifically a propshaft tube, having an embodiment of a dampener;

FIG. 2 depicts the propshaft tube having another embodiment of a dampener;

FIG. 3 is a sectional view taken at lines 3-3 in FIG. 2;

DETAILED DESCRIPTION

Figure 4:
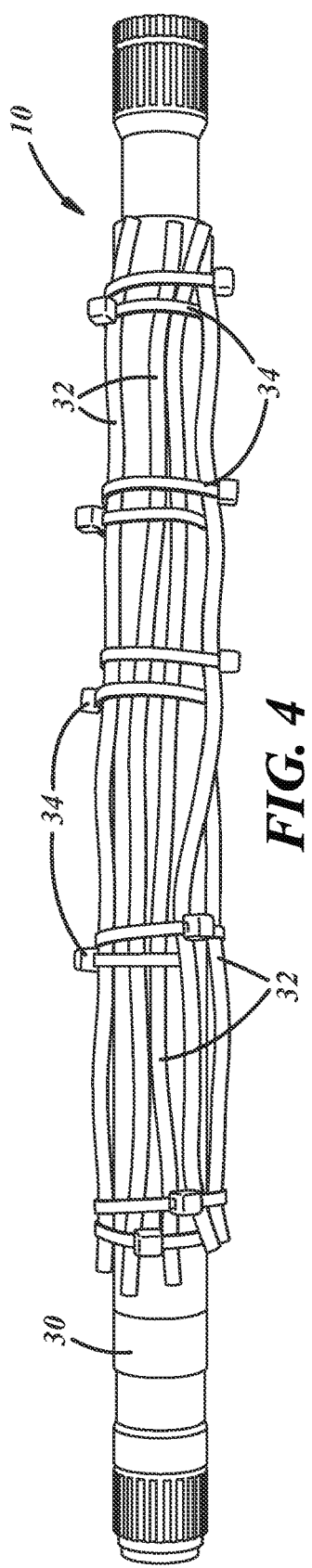
FIG. 4 depicts an automotive driveline component, specifically a bar shaft, having another embodiment of a dampener.

Referring in more detail to the drawings, an automotive driveline component 10 experiences vibrations and other oscillations during its use in an automobile. Depending on the component, the vibrations and oscillations typically include flexural vibrations with bending and breathing modes. The automotive driveline component 10 is equipped with a dampener in order to dissipate, and in some instances substantially eliminate, at least some of the vibrations and modes experienced by the component. The automotive driveline component 10 can be a propshaft (FIGS. 1, 2, 21), a bar shaft (FIGS. 4, 5, 6), and a torque tube housing (FIGS. 7, 22, 23); the automotive driveline component 10 can also be a halfshaft, a power transfer unit (PTU) housing (FIGS. 22, 23), a final drive unit (FDU) housing (FIGS. 22, 23), a differential housing, or another component installed in an automotive driveline that experiences unwanted vibrations during its operation.

Referring to the embodiment of FIG. 1, the automotive driveline component 10 is a propshaft that includes a housing 12, a dampener 14, and a vibration-transmitting attachment 16. The housing 12 is the structure of the propshaft that vibrates undesirably during use, and that is hence subjected to damping. The housing 12 here is a hollow metal tube 18, but could have other designs and constructions depending upon—among other possible influences—the design and construction of the propshaft and the design and construction of other components installed in the larger driveline assembly.

The dampener 14 receives the vibrations emitted from the housing 12, and dissipates or altogether eliminates the vibrations. In this embodiment the dampener 14 includes multiple wires 20 carried on an outer surface 22 of the tube 18. Each wire 20 consists of many individual metal wire strands contained inside an outer insulator. The metal wire strands can be composed of aluminum (Al) or copper (Cu) or another metal material, and the insulator can be composed of a plastic material. FIG. 1 illustrates two wires 20 arranged parallel with an axis of the tube 18; it has been found that arranging the wires 20 along the tube's axis is particularly effective at damping a first and second bending vibrational mode of the tube 18. Still, there could be different quantities of wires and they could be arranged in different ways relative to the tube and relative to each other. For example, one or four or more wires 20 could be positioned around the tube 18, The wires 20 could be carried, on an inner surface of the tube 18, which is a preferable location for a production component in some embodiments. And different lengths and other dimensions of the wires 20 could be provided. In the case of the propshaft presented here, as well as other rotating driveline components, the dampener 14 can be arranged symmetrically on the housing 12 in order to avoid unbalancing the center of mass of the automotive driveline component 10.

The vibration-transmitting attachment 16 is a structure that serves as a pass-through for vibrations from the housing 12 and to the dampener 14, and joins the dampener and housing together. In this embodiment the vibration-transmitting attachment 16 includes multiple zip ties 24 secured around the tube 18 and around the wires 20. The zip ties 24 can be composed of a plastic material or a metal material. FIG. 1 illustrates multiple zip ties 24 spanned circumferentially about the tube 18 and spaced axially apart from one another; still, the zip ties 24 could be arranged in different ways relative to the tube and relative to each other. As before, the vibration-transmitting attachment 16 can be arranged symmetrically on the housing 12 in order to avoid unbalancing the center of mass of the automotive driveline component 10 as it rotates during operation.

In use, when the tube 18 vibrates, the vibrations pass-through the zip ties 24 to the wires 20 where the vibrations are dissipated or altogether eliminated by the individual wire strands. Without intending to be bound to a particular theory of causation, it is currently believed that relative movement among the individual metal wire strands generates friction and thereby converts vibrational energy into heat energy. This energy conversion, it is believed, reduces or altogether eliminates the vibrations and oscillations in the tube 18 and in the propshaft.

Referring now to the embodiment of FIGS. 2 and 3, the dampener 14 includes multiple wire strand bundles 26 in place of the wires of FIG. 1. Each wire strand bundle 26 consists of many individual metal wire strands kept together without an outer insulator, as perhaps illustrated best by the sectional view in FIG. 3. Like before, the metal wire strands can be composed of a metal material such as Al or Cu. There could also be different quantities of wire strand bundles 26 than illustrated in FIG. 2, and they could be arranged in different ways relative to the tube and relative to each other, as set forth above. Furthermore, in this embodiment the vibration-transmitting attachment 16 is an adhesive 28 provided in place of the zip ties of FIG. 1. The adhesive 28 is applied directly to the tube 18 and directly to the wire strand bundles 26 at numerous locations along the longitudinal extent of the bundles. The adhesive 28 can be a super glue material, hot melt material, or some other adhesive. The adhesive 28 could be laid down in different quantities than that shown in FIG. 2, and could be arranged in different ways relative to the tube 18 and relative to each other, as set forth above. When solidified, vibrations can pass through the hardened structure of the adhesive 28 and to the wire strand bundles 26.

Referring now to the embodiment of FIG. 4, the automotive driveline component 10 is a bar shaft and the housing 12 is a metal body 30. The body 30 can have a solid construction and can be hollow at some of its sections. The bar shaft can be part of a larger halfshaft assembly. As before, the dampener 14 in this embodiment includes multiple wires 32 with many individual metal wire strands contained in an outer insulator, and the vibration-transmitting attachment 16 includes multiple zip ties 34 secured around the body 30 and around the wires 32.

Figure 5:
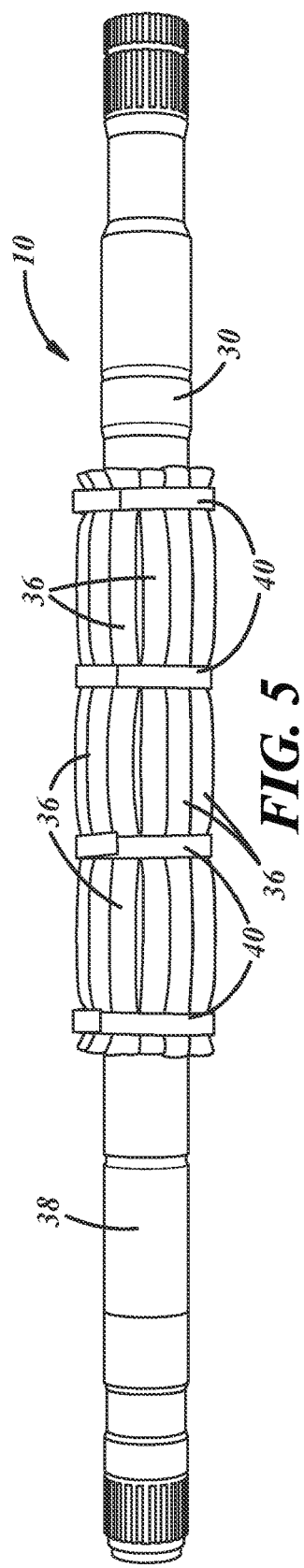
FIG. 5 depicts the bar shaft having another embodiment of a dampener.
Figure 6:
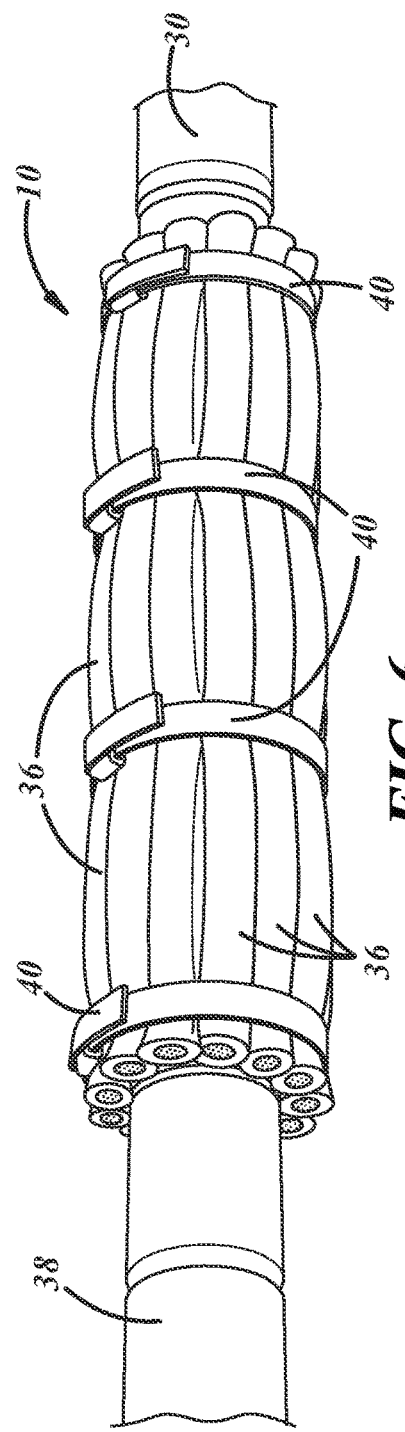
FIG. 6 is another depiction of the bar shaft and dampener of FIG. 5.

Referring now to the embodiment of FIGS. 5 and 6, the dampener 14 includes multiple wires 36 having many individual metal wire strands contained in an outer insulator. Here, there can be a total of twelve wires 36 carried on an outer surface 38 of the body 30 and held close together in abutment with each other. Each wire 36 can have a length of approximately six-and-a-half inches, and the individual metal wires strands can be provided as eight gauge wire made of Cu. Of course, other lengths, gauges, and materials are possible. Furthermore, in this embodiment the vibration-transmitting attachment 16 includes multiple clamps 40 tightened around the body 30 and over the wires 36. The clamps 40 are composed of a metal material in FIGS. 5 and 6, and four of them can be supplied. In this particular embodiment, vibrations are transmitted directly from the body 30 to the wires 36 via tight securement imparted by the clamps 40. Still, vibrations can pass among the wires 36 through the clamps 40. The clamps 40 could be installed in different quantities, and could be arranged in different ways relative to the body 30 and relative to each other, as set forth above.

Figure 7:
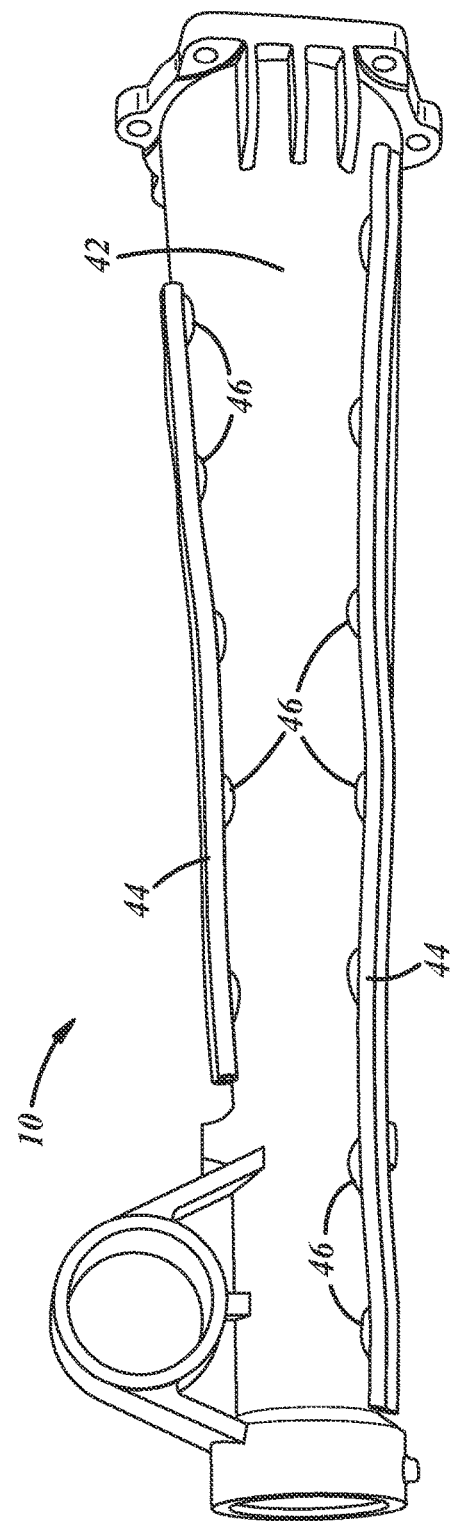
FIG. 7 depicts an automotive driveline component, specifically a torque tube housing, having another embodiment of a dampener.

Referring now to the embodiment of FIG. 7, the automotive driveline component 10 is a torque tube and the housing 12 is a torque tube housing 42. The torque tube housing 42 can be manufactured by a casting process or by another metalworking process, and can be composed of an Al material or another material. As before, the dampener 14 in this embodiment includes multiple wires 44 having many individual metal wire strands contained in an outer insulator. Here, there can be a total of four wires 44 and the individual metal wire strands can be provided as eight gauge wire made of Cu. The vibration-transmitting attachment 16 in this embodiment is an adhesive 46 applied directly to an outer surface of the torque tube housing 42 and directly to the wires 44. The adhesive 46 can be a hot melt material. In some instances, having multiple discrete wires 44 at multiple locations may enhance the vibration-dissipation capabilities of the dampener 14.

Figure 21:
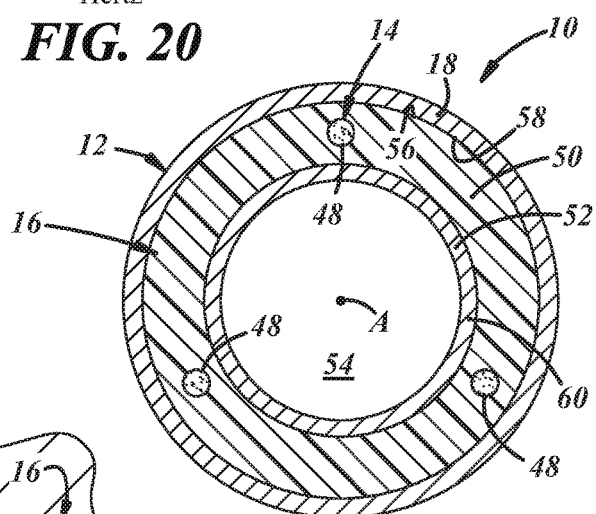
FIG. 21 is a sectional view depicting an automotive driveline component, specifically a propshaft tube, having another embodiment of a dampener.

Referring now to the embodiment of FIG. 21, the automotive driveline component 10 can be a propshaft and the housing 12 can be a hollow metal tube 18. The automotive driveline component 10 could be other driveline components that employ hollow metal tubes as housings. The dampener 14 in this embodiment includes three wires 48, each having many individual metal wire strands that may or may not be contained in an outer insulator. The wires 48 can be set around, the circumference of the hollow metal tube 18, and can be spaced approximately one-hundred-and-twenty degrees (120°) apart from one another. Although not readily depicted by the sectional view presented by FIG. 21, the wires 48 are arranged parallel and in-line with a center axis A of the hollow metal tube 18. Still, as in other embodiments detailed elsewhere in this description, there can be other quantities of wires provided, the wires can have different spacings relative to one another, and the wires can be arranged in different ways relative to the hollow metal tube 18. As set forth earlier, it has been found that arranging the wires 48 in-line with the center axis A is particularly effective at damping a first and second bending vibrational mode of the hollow metal tube 18; the arrangement may also be particularly effective at clamping a breathing vibrational mode of the hollow metal tube 18. In previously-known examples, dampener devices have been wrapped helically around a tube; while this arrangement might be suitable in some cases, the in-line arrangement of FIG. 21 is believed to have an improved damping effect on bending vibrational modes.

The vibration-transmitting attachment 16 in this embodiment is provided by more than one component: a carrier 50 and multiple clamps 52. The carrier 50 holds the wires 48 in place and positions the wires with respect to one another, even before the carrier 50 is assembled in the hollow metal tube 18, The carrier 50 may be employed to locate and telescope the wires 48 at an interior 54 of the hollow metal tube 18. In this circumstance, the carrier 50 can aid in setting the wires 48 in place at the interior 54, compared to placement of discrete and detached, wires without a carrier. The interior location may be preferable in some automotive driveline installations where an exterior location may physically interfere with other components in the larger driveline system, or where packaging constraints do not permit additional exterior structures. Although not readily apparent from the sectional view of FIG. 21, the carrier 50 can have a lengthwise and axial extent that spans partly or more along a lengthwise and axial extent of the hollow metal tube 18. The carrier 50 can have different designs and constructions, dictated in some regard by the particular automotive driveline component with which the carrier is assembled. In the embodiment of FIG. 21, the carrier 50 can be a polymer blanket or plastic tubing, and the wires 48 can be embedded therein. In the polymer blanket example, the carrier 50 can exhibit a degree of pliability so that the carrier 50 can be more readily set within the interior 54. The polymer blanket example could also be used with the bar shaft of FIG. 4. In the plastic tubing example, the carrier 50 can be shaped and sized for insertion within the interior 54. Still, other examples of carrier constructions are possible including a carrier that is a fully solid cylinder. When assembled, an outer surface 56 of the carrier 50 can make direct surface-to-surface abutment against an inner surface 58 of the hollow metal tube 18. By this abutment, vibrations are transmitted from the hollow metal tube 18 and to the carrier 50.

The clamps 52 are radially expandable clamps that exert radially outward forces against the carrier 50. The carrier 50 is hence secured against the inner surface 58 of the hollow metal tube 18. Vibrations can pass among the wires 48 partly via the clamps 52 and partly via the structure of the carrier 50. Clamps of this type sometimes include a band and a tightening mechanism such as a worm gear mechanism. Clamps also include other types of internal retention devices such as retaining rings. In the sectional view of FIG. 21, only a single band 60 of a single clamp 52 is illustrated. But in assembly multiples clamps 52 can be employed and spaced axially along the lengthwise and axial extent of the carrier 50 in order to secure the carrier 50 against the hollow metal tube 18 at different axial sites along the carrier 50. Furthermore, instead of a clamp, the wires 48 could themselves be crimped or deformed in another way after being placed, within the interior 54; the crimping or deformation would maintain the wires 48 in place within the interior 54.

Figure 22:
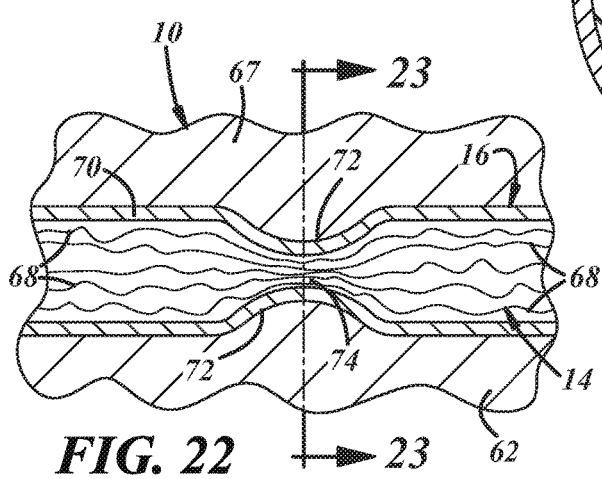
FIG. 22 is an enlarged view of another embodiment of a dampener embedded in a wall of an automotive driveline component.
Figure 23:
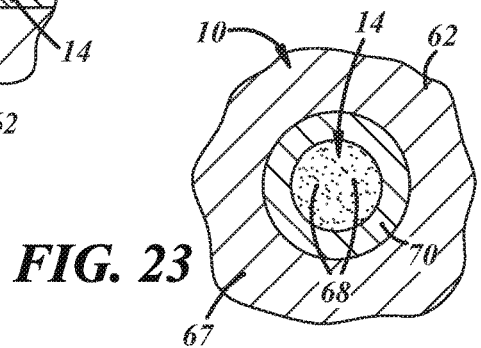
FIG. 23 is a sectional view taken at lines 23-23 in FIG. 22.

Referring now to the embodiment of FIGS. 22 and 23, the automotive driveline component 10 can include a housing 62 which may be a torque tube housing, a PTU housing, or an FDU housing. The housing 62, includes a wall 67 that can be composed of an Al material. The wall 67 may be part of a main body or a cover of the housing 62. The dampener 14 in this embodiment includes metal wire strands in the form of metal wire mesh strands 68. The metal wire mesh strands 68 can be composed of Cu, Al, or another metal material. In one embodiment, the metal wire mesh strands 68 are made up of steel wool bundles. The metal wire mesh strands 68 can include numerous individual metal wire strands that are tightly packed and intertwined and tangled together.

The vibration-transmitting attachment 16 in this embodiment includes a casing 70. The casing 70 is carried by the wall 67 and holds the metal wire mesh strands 68 within its interior. The metal wire mesh strands 68 are held, but yet are free to move relative to each other when subjected to vibrations. The casing 70 can be composed of a metal material with a higher melting temperature than that of the wall 67. In one example the casing 70 is composed of a steel material, while the wall is composed of an Al material. As depicted by FIGS. 22 and 23, the casing 70 can be set within the housing 62, by being embedded into the wall 67, The casing 70 can hence be buried into the wall's material and thickness, and can be bounded on all sides by the wall 67. Cast-in-place processes are one way this type of embedment can be carried out, but other processes may be possible. Since the material of the casing 70 has a higher melting temperature than the material of the wall 67, the casing 70 remains intact and shields the metal wire mesh strands 68 as the molten material of the wall 67 surrounds the casing 70 prior to solidification.

Furthermore, although not depicted in FIGS. 22 and 23, the casing 70 can have a generally elongated and tubular shape, and can have closed terminal ends. There can be multiple separate and discrete casings 70 with metal wire mesh strands 68 contained therein positioned and located at different sites in the housing 62. At different locations along its lengthwise and axial extent, and as shown in one instance in FIG. 22, the casing 70 can have one or more depressions 72 that are pinched or otherwise formed in the casing's body. The depression 72 can span completely around the circumference of the casing 70, though need not. When the depression 72 is formed in the casing 70, the metal wire mesh strands 68 can be already inserted into the casing's interior. This way, the metal wire mesh strands 68 occupying the area subject to the formation are pressed even more closely together. A squeezed section 74 of the metal wire mesh strands 68 are more tightly packed together than unsqueezed metal wire mesh strands 68 located away from the depression 72. It is currently believed that the squeezed section 74 augments the vibration damping capabilities of the metal wire mesh strands 68.

In some of the embodiments detailed in this description, the dampener 14 is capable of damping all flexural modes. In the past, a dedicated dampener device might have been used to solely damp a first bending vibrational mode, and another and additional dedicated dampener device might have been used to solely damp a second bending vibrational mode. Instead of two discrete dampener devices, the dampener 14 may be used to effectively damp both the first and second bending vibrational modes, as well as other flexural modes. Similarly, in embodiments with components that are hollow, such as the propshaft tube of FIG. 1, the dampener 14 can damp both first and second bending vibrational modes and a breathing vibrational mode.

Moreover, in any of the embodiments detailed in this description, the degree of vibration damping and dissipation may be tuned for a particular application and for a particular vibrational mode. In different examples, one or more of the following could be altered for tuning purposes: the number of wires, the number of individual metal wire strands, the length of wires, the locations of wires, the material of one or more or all of the wires, and the number of vibration-transmitting attachments. The exact tuning, if performed at all, will depend on the particular driveline application.

Figure 8:
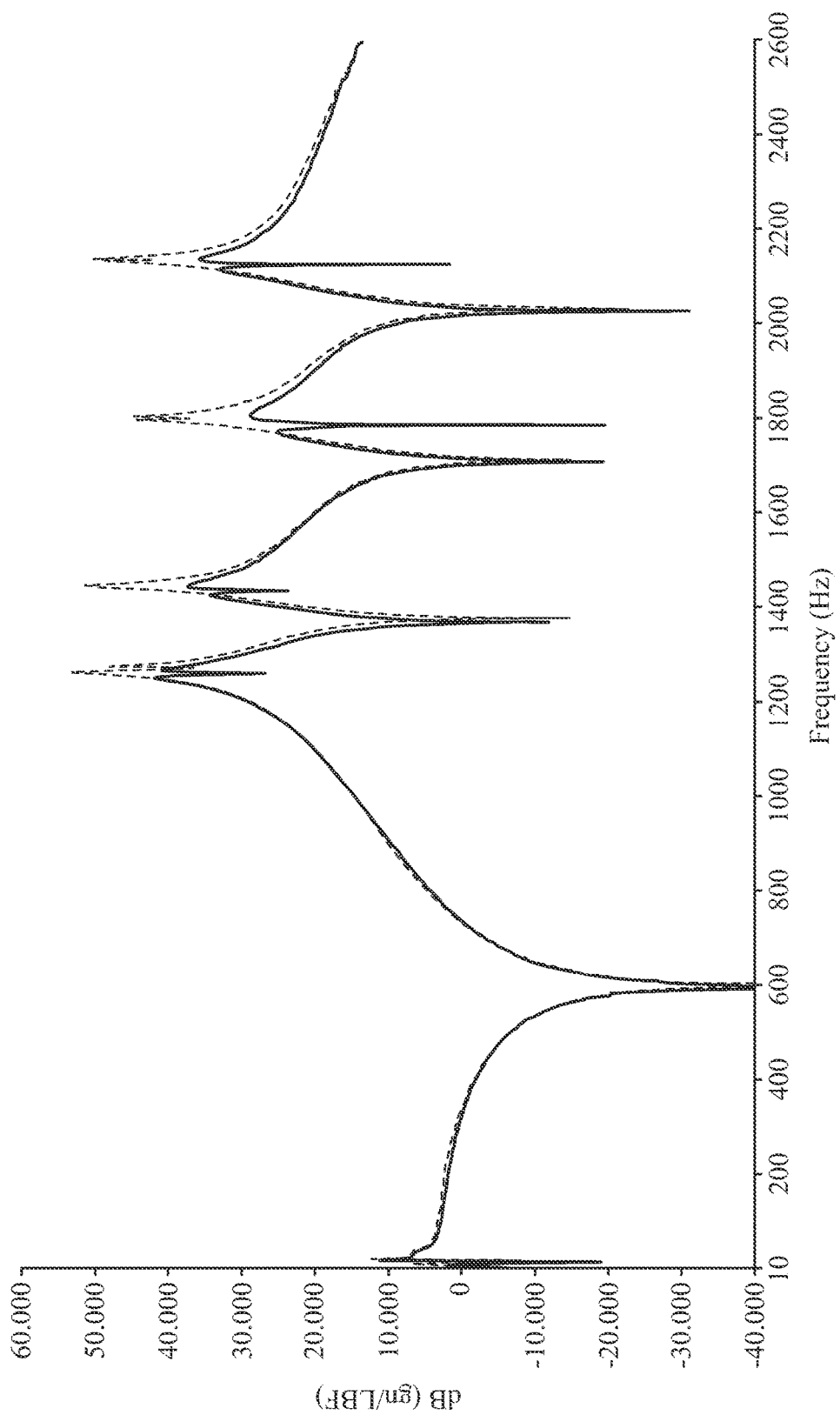
FIG. 8 is a graph comparing vibration levels of the propshaft tube and dampener of FIG. 1 (solid line) to the same propshaft tube without the dampener (broken line), decibels (dB) are plotted on the y-axis and hertz (Hz) are plotted on the x-axis.
Figure 9:
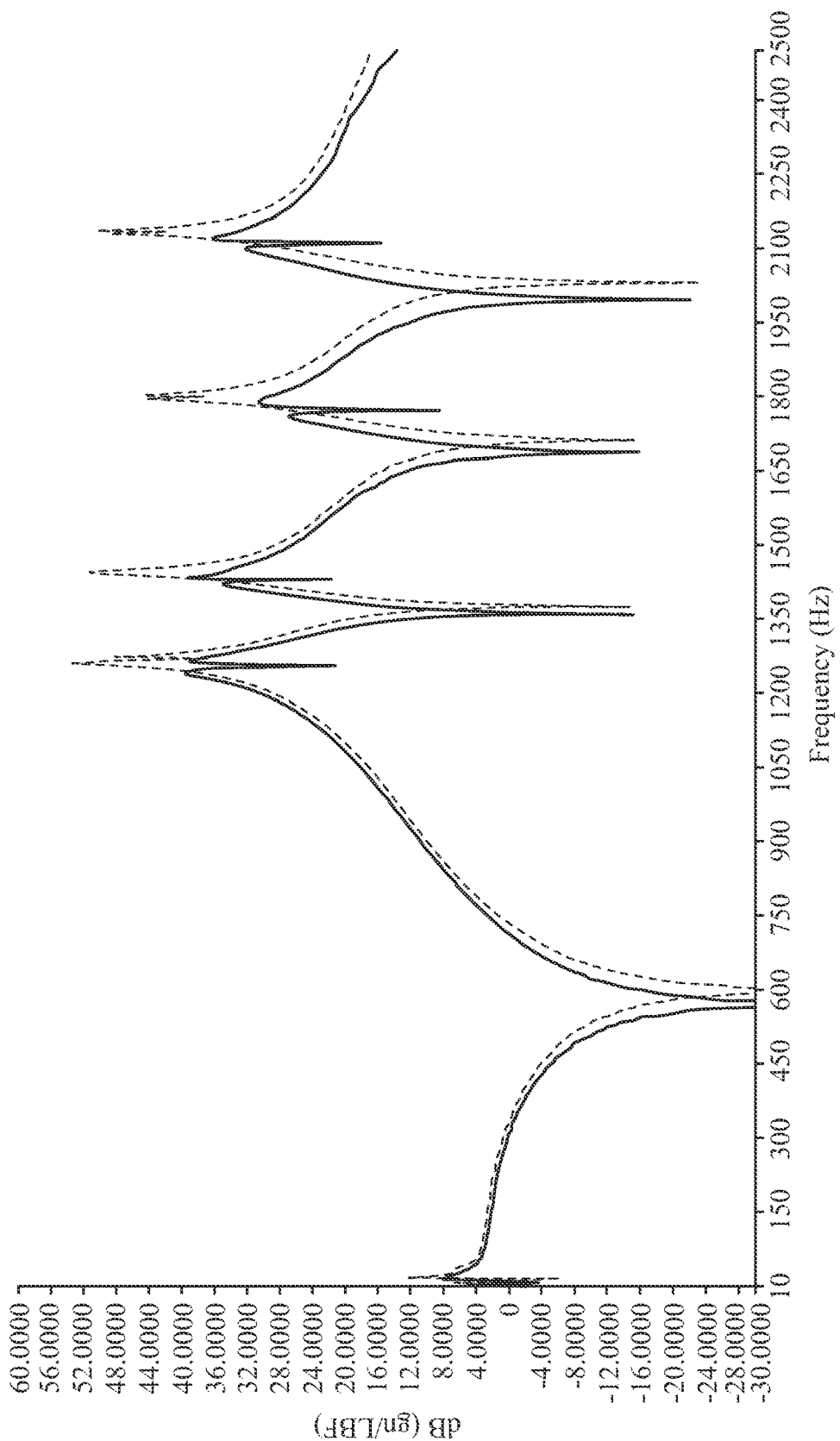
FIG. 9 is a graph comparing vibration levels of the propshaft tube and dampener of FIG. 2 (solid line) to the same propshaft tube without the dampener (broken line), decibels (dB) are plotted on the y-axis and hertz (Hz) are plotted on the x-axis.
Figure 10:
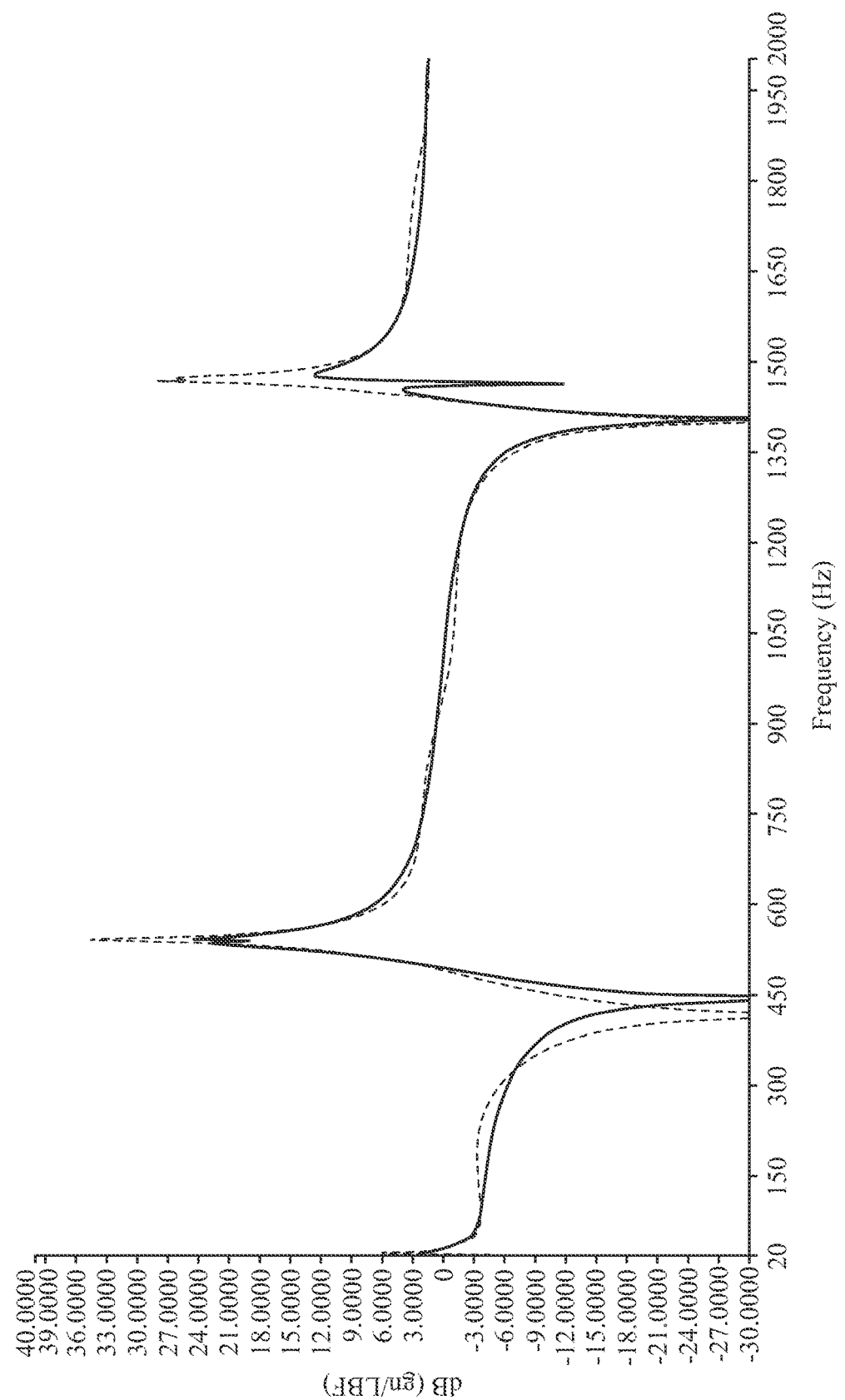
FIG. 10 is a graph comparing vibration levels of the bar shaft and dampener of FIG. 4 (solid line) to the same bar shaft without the dampener (broken line), decibels (dB) are plotted on the y-axis and hertz (Hz) are plotted on the x-axis.
Figure 11:
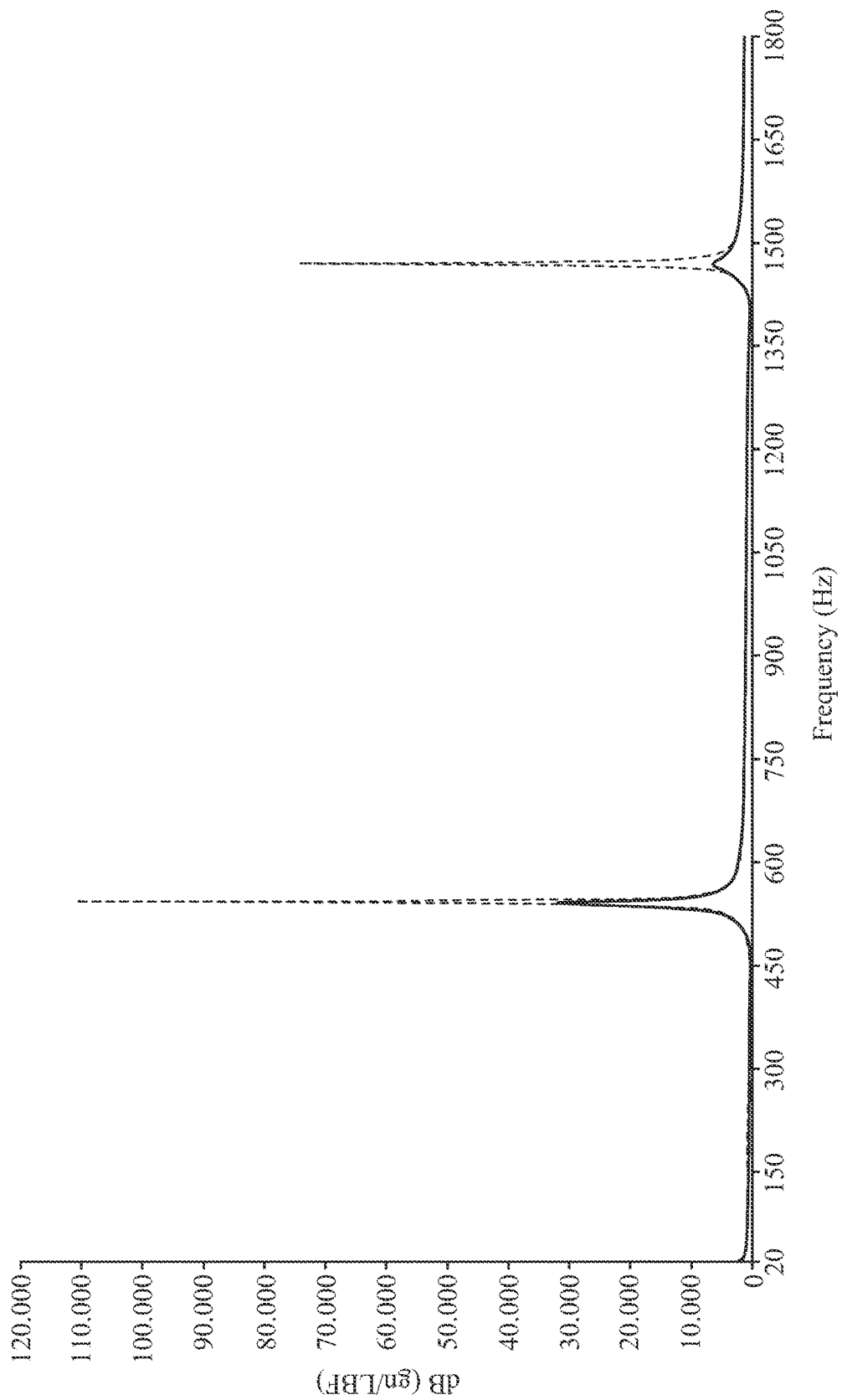
FIG. 11 is a graph comparing vibration levels of the bar shaft and dampener of FIG. 4 (solid line) to the same bar shaft without the dampener (broken line), decibels (dB) are plotted on the y-axis and hertz (Hz) are plotted on the x-axis.
Figures 12, 13:
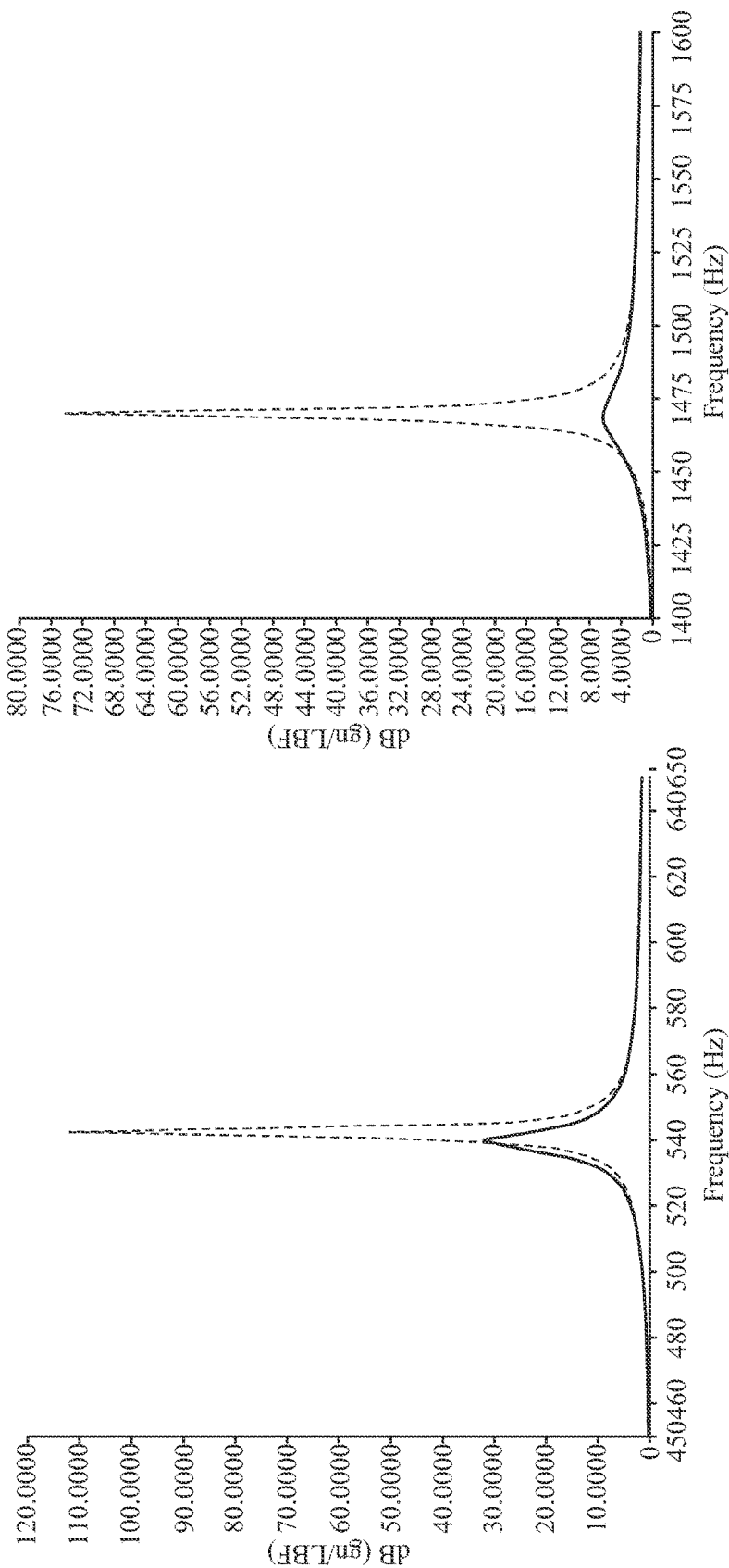
FIG. 12 is a graph comparing first bending modes of the bar shaft and dampener of FIG. 4 (solid line) to the same bar shaft without the dampener (broken line), decibels (dB) are plotted on the y-axis and hertz (Hz) are plotted on the x-axis.
FIG. 13 is a graph comparing second bending modes of the bar shaft and dampener of FIG. 4 (solid line) to the same bar shaft without the dampener (broken line), decibels (dB) are plotted on the y-axis and hertz (Hz) are plotted on the x-axis.
Figure 14:
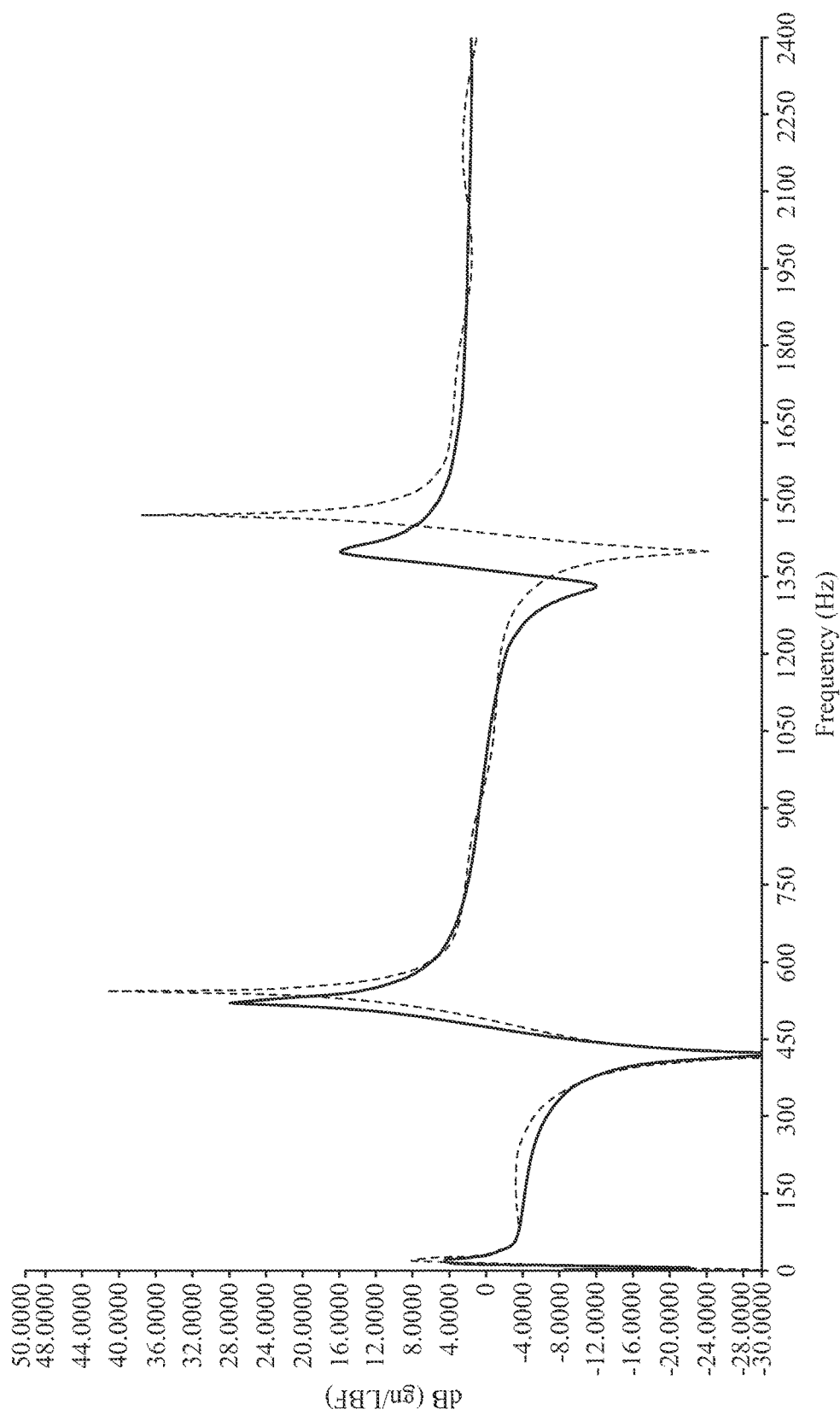
FIG. 14 is a graph comparing vibration levels of the bar shaft and dampener of FIGS. 5 and 6 (solid line) to the same bar shaft without the dampener (broken line), decibels (dB) are plotted on the y-axis and hertz (Hz) are plotted on the x-axis.
Figure 15:
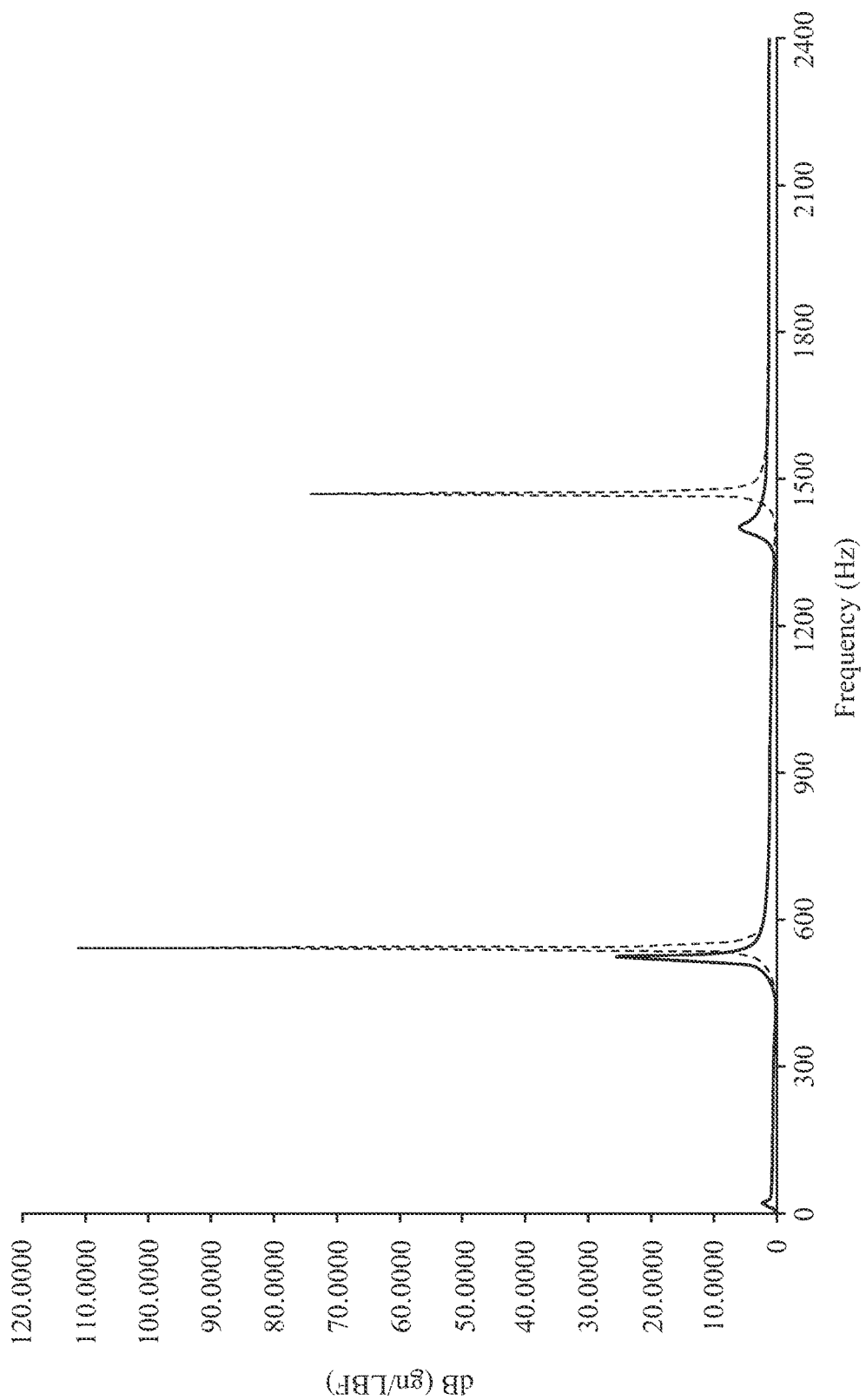
FIG. 15 is a graph comparing vibration levels of the bar shaft and dampener of FIGS. 5 and 6 (solid line) to the same bar shaft without the dampener (broken line), decibels (dB) are plotted on the y-axis and hertz (Hz) are plotted on the x-axis.
Figure 16:
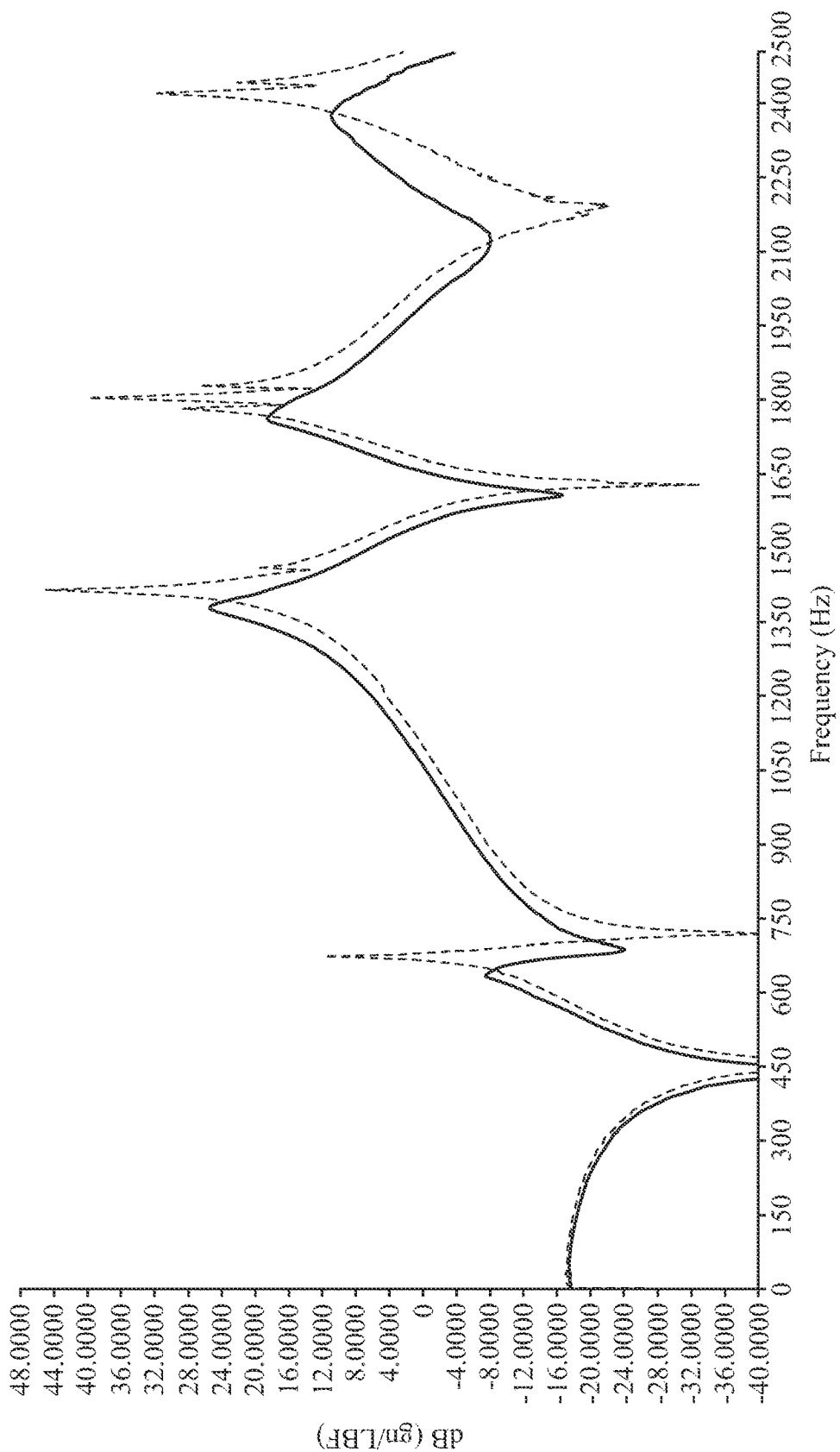
FIG. 16 is a graph comparing vibration levels of the torque tube housing and dampener of FIG. 7 (solid line) to the same torque tube housing without the dampener (broken line), decibels (dB) are plotted on the y-axis and hertz (Hz) are plotted on the x-axis.
Figure 17:
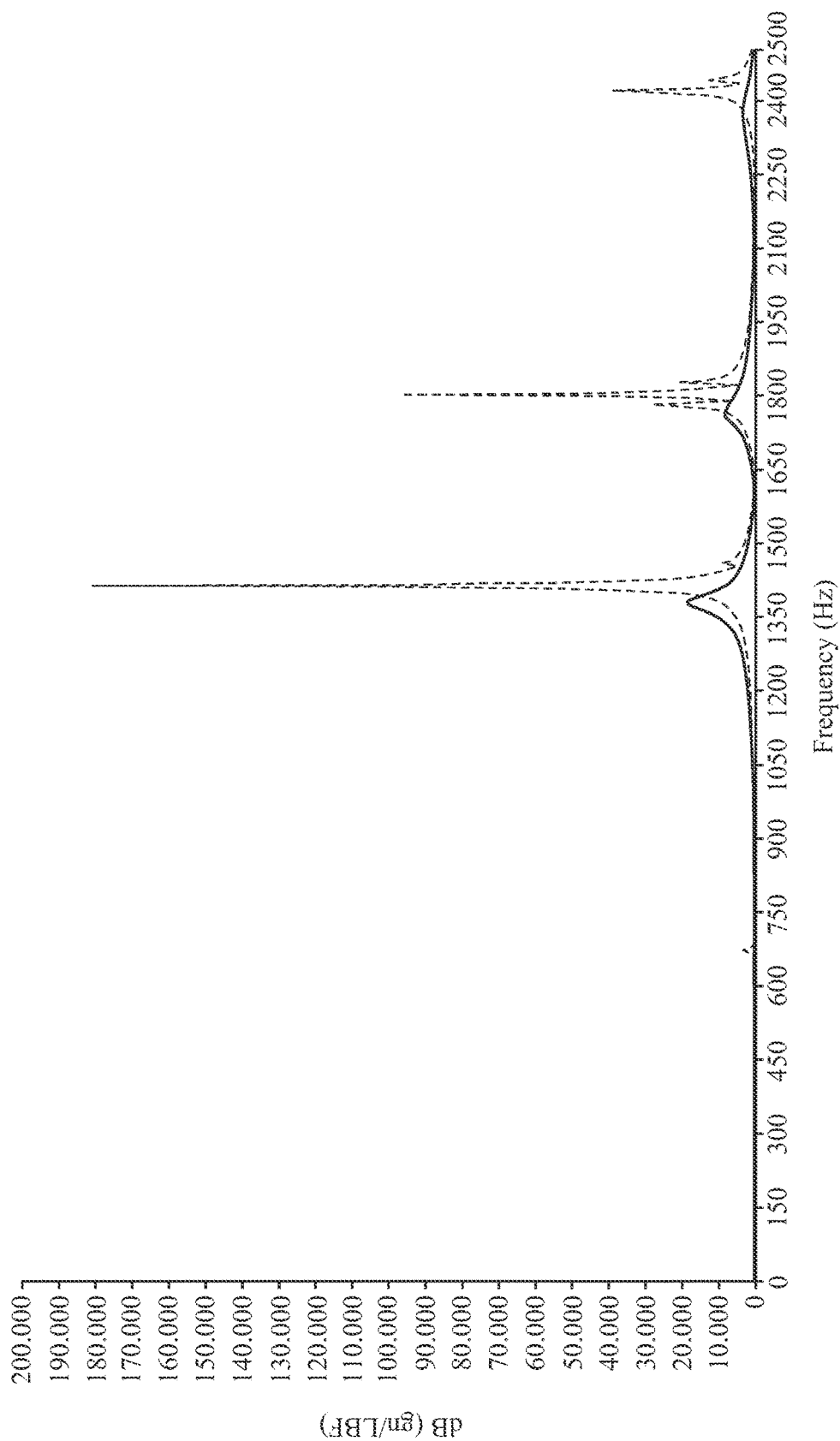
FIG. 17 is a graph comparing vibration levels of the torque tube housing and dampener of FIG. 7 (solid line) to the same torque tube housing without the dampener (broken line), decibels (dB) are plotted on the y-axis and hertz (Hz) are plotted on the x-axis.
Figure 18:
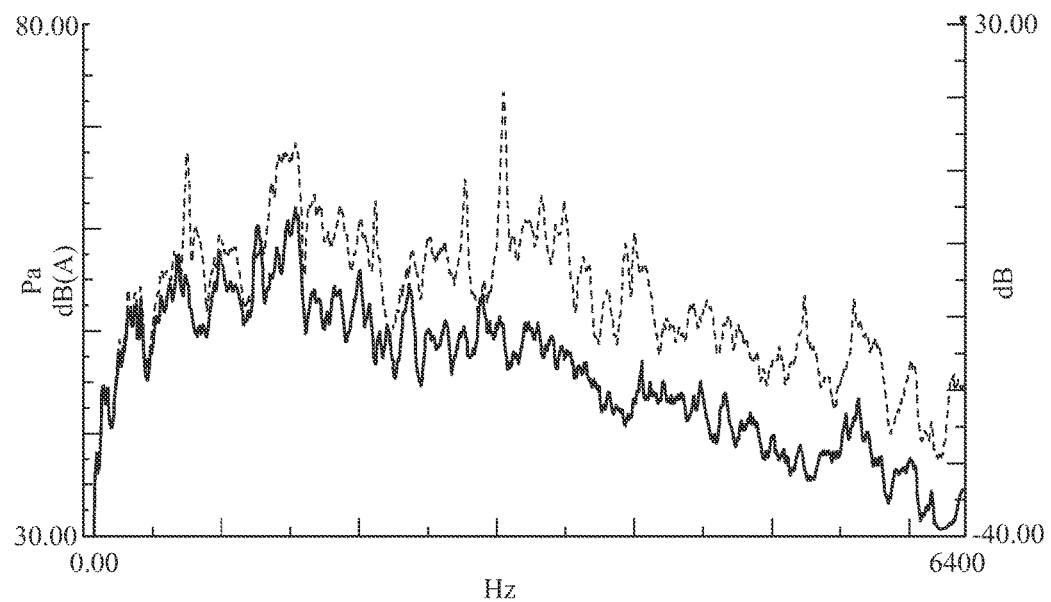
FIG. 18 is a graph comparing overall sound pressure levels of a torque tube housing with an embodiment of a dampener (solid, line) to the same torque tube housing without the dampener (brokers line), decibels (dB) are plotted on the y-axis and hertz (Hz) are plotted on the x-axis.
Figure 19:
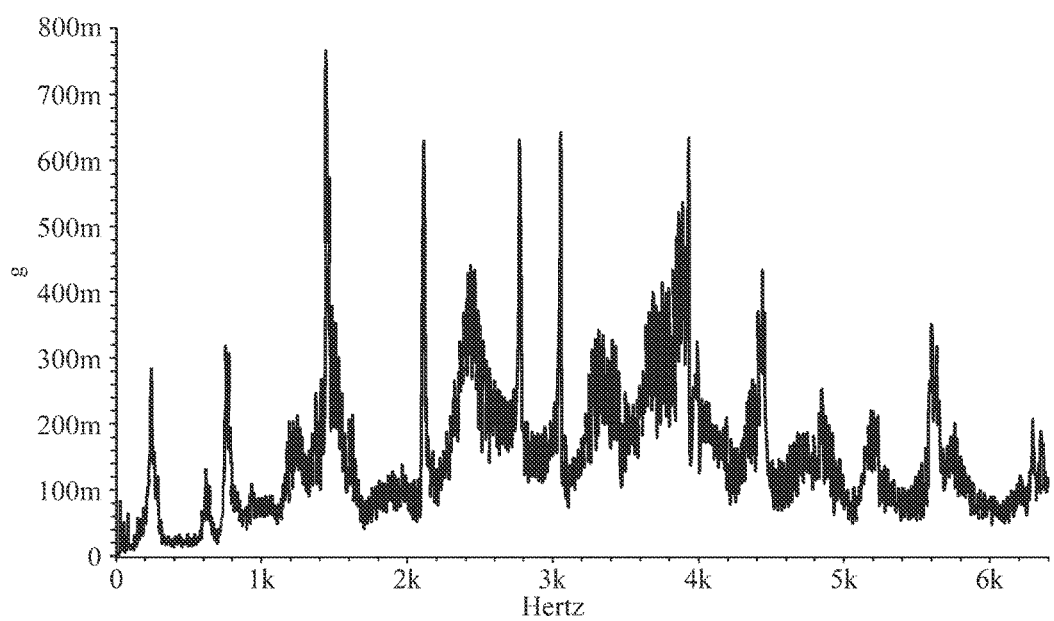
FIG. 19 is a graph depicting acceleration of vibration of an automotive driveline component, specifically a rear drive unit (RDU), without a dampener.
Figure 20:
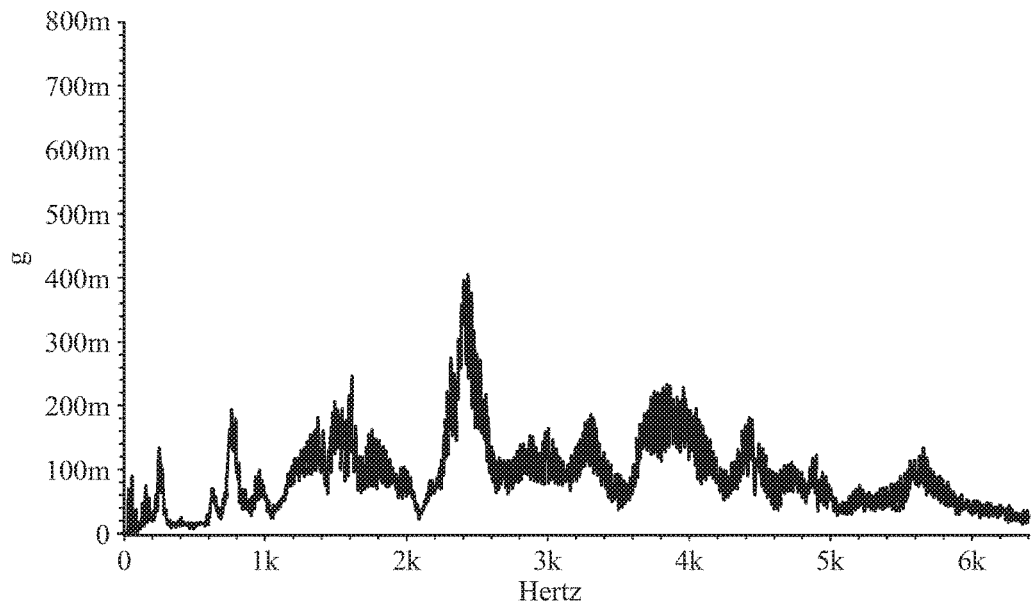
FIG. 20 is a graph depicting acceleration of vibration of the RDU of FIG. 19 but with a dampener.

FIGS. 8-20 are graphs that show the results of testing conducted on the different embodiments of FIGS. 1-7, as well as other embodiments. In the graphs of FIGS. 8-18, decibels (dB) are plotted on the y-axis and hertz (Hz) are plotted on the x-axis. Testing was conducted for the embodiments with the dampeners and vibration-transmitting attachments (solid line), and without the dampeners and vibration-transmitting attachments (broken line), and the results compared. In each case, the results demonstrate the damping capabilities and effectiveness of the different dampeners and vibration-transmitting attachments. The graph of FIG. 8 shows results for the embodiment of FIG. 1, and depicts bending and breathing vibrational modes. The graph of FIG. 9 shows the results for the embodiment of FIG. 2, and depicts both bending and breathing vibrational modes. The graphs of FIGS. 10 and 11 show the results for the embodiment of FIG. 4, and depict first and second bending vibrational modes. FIG. 12 is an enlarged view of the first bending vibrational mode presented in FIG. 11, and FIG. 13 is an enlarged view of the second bending vibrational mode presented in FIG. 11. The graphs of FIGS. 14 and 15 show the results for the embodiment of FIGS. 5 and 6, and depict first and second bending vibrational modes. The graph of FIG. 16 shows the results for the embodiment of FIG. 7, and depicts bending and breathing vibrational modes. FIG. 17 shows the results for a torque tube housing similar to that of FIG. 7; the dampener used, with the torque tube housing included three metal casings, each with steel wool bundles inserted, therein; the three metal casings were attached to the outer surface of the torque tube housing via a hot melt material. The graph of FIG. 18 compares overall sound pressure levels measured in the free field of a torque tube housing with three wires carried by it (solid line) to the same torque tube housing without the wires and without any dampener devices (broken line). The graph of FIG. 19 depicts acceleration of vibration of a rear drive unit (RDU) that does not have a dampener device, and the graph of FIG. 20 depicts acceleration of vibration of the same RDU but with a dampener in the form of metal wire strands mounted on the RDU.

While the forms of the disclosure constitute presently preferred embodiments, many others are possible. It is not intended herein to mention all the possible equivalent forms or ramifications of the disclosure. It is understood that the terms used herein are merely descriptive, rather than limiting, and that various changes may be made without departing from the spirit or scope of the invention.

The invention claimed is:

1. A damped automotive driveline component, comprising:
   a housing;
   a dampener carried by said housing, said dampener including a plurality of metal wire strands; and
   a vibration-transmitting attachment holding said dampener to said housing, wherein, when said housing experiences vibrations during use of the automotive driveline component, the vibrations are transmitted to said plurality of metal wire strands via said vibration-transmitting attachment and relative movement among said plurality of metal wire strands damps the vibrations experienced by said housing, wherein said housing includes a wall and said vibration-transmitting attachment includes a casing carried by said wall and in which said wire strands are received, and wherein said casing has at least one pinched depression, and said plurality of metal wire strands having at least one squeezed section situated at said at least one pinched depression of said casing.

2. The damped automotive driveline component as set forth in claim 1, wherein, when said housing experiences vibrations during use of the automotive driveline component and there is relative movement among said plurality of metal wire strands.

3. The damped automotive driveline component as set forth in claim 1, further comprising a plurality of casings carried by said wall and located apart from one another, each of said plurality of casings holding a plurality of metal wire strands, wherein, when said wall experiences vibrations during use of the automotive driveline housing, relative movement occurs among said plurality of metal wire strands within each of said plurality of casings.

4. The damped automotive driveline component as set forth in claim 1, wherein said wall is composed of a first metal material and said casing is composed of a second metal material, the second metal material having a higher melting temperature than the first metal material.

5. The damped automotive driveline component as set forth in claim 4, wherein said casing is carried by said wall via a cast-in-place embedment within said wall, said casing bounded by the first metal material of said wall on all sides of said casing.

6. The damped automotive driveline component as set forth in claim 1, wherein said plurality of metal wire strands comprises steel wool.

7. A damped automotive driveline housing, comprising:
a wall;
a casing carried by said wall; and
a plurality of metal wire strands held within said casing, wherein, when said wall experiences vibrations during use of the automotive driveline housing, relative movement among said plurality of metal wire strands damps the vibrations experienced by said wall, and wherein said wall is composed of a first metal material and said casing is composed of a second metal material, the second metal material having a higher melting temperature than the first metal material.

8. The damped automotive driveline housing as set forth in claim 7, wherein the automotive driveline housing is a torque tube housing, a power transfer unit (PTU) housing, or a final drive unit (FDU) housing.

9. The damped automotive driveline housing as set forth in claim 7, further comprising a plurality of casings carried by said wall and located apart from one another, each of said plurality of casings holding a plurality of metal wire strands, wherein, when said wall experiences vibrations during use of the automotive driveline housing, relative movement occurs among said plurality of metal wire strands within each of said plurality of casings.

10. The damped automotive driveline housing as set forth in claim 7, wherein said casing is carried by said wall via a cast-in-place embedment within said wall, said casing bounded by the first metal material of said wall on all sides of said casing.

11. The damped automotive driveline housing as set forth in claim 7, wherein said casing has at least one pinched depression, and said plurality of metal wire strands having at least one squeezed section situated at said at least one pinched depression of said casing.

12. The damped automotive driveline housing as set forth in claim 7, wherein said plurality of metal wire strands comprises steel wool.

* * * * *